(12) United States Patent
Weiss

(10) Patent No.: US 9,042,012 B2
(45) Date of Patent: May 26, 2015

(54) ILLUMINATING ARRANGEMENT FOR A MICROSCOPE

(71) Applicant: Leica Microsystems CMS GmbH, Wetzlar (DE)

(72) Inventor: Albrecht Weiss, Linden (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 267 days.

(21) Appl. No.: 13/649,243

(22) Filed: Oct. 11, 2012

(65) Prior Publication Data

US 2013/0094078 A1 Apr. 18, 2013

(30) Foreign Application Priority Data

Oct. 14, 2011 (DE) .......................... 10 2011 084 574

(51) Int. Cl.
  *G02B 21/06* (2006.01)
  *G02B 21/08* (2006.01)
  *G02B 27/14* (2006.01)

(52) U.S. Cl.
  CPC ............ *G02B 21/086* (2013.01); *G02B 27/141* (2013.01)

(58) Field of Classification Search
  USPC ................... 359/385, 387, 388; 362/612, 613
  See application file for complete search history.

(56) References Cited

U.S. PATENT DOCUMENTS

| 4,852,985 | A  | * | 8/1989  | Fujihara et al. ............... 359/387 |
| 5,489,771 | A  | * | 2/1996  | Beach et al. .................. 250/205 |
| 6,369,939 | B1 |   | 4/2002  | Weiss et al. |
| 7,358,679 | B2 | * | 4/2008  | Lys et al. .......................... 315/51 |
| 7,832,894 | B2 | * | 11/2010 | Rudolph et al. ............... 362/231 |
| 8,025,417 | B2 | * | 9/2011  | Pohlert et al. ...................... 362/9 |
| 2005/0249457 | A1 |   | 11/2005 | Seyfried et al. |
| 2006/0187542 | A1 | * | 8/2006  | Westphal et al. ............. 359/389 |
| 2007/0268575 | A1 |   | 11/2007 | Yamazaki |
| 2010/0073757 | A1 |   | 3/2010  | Birk et al. |
| 2014/0070106 | A1 | * | 3/2014  | Westphal et al. ............. 250/368 |

* cited by examiner

*Primary Examiner* — Frank Font
(74) *Attorney, Agent, or Firm* — Hodgson Russ LLP

(57) ABSTRACT

Illuminating arrangement for a microscope (200) having a first LED (10) for providing light with a first intensity spectrum (K1) with at least two intensity maxima and an intensity minimum located between the intensity maxima, and at least one further LED (20) for providing light with a further intensity spectrum (K2) respectively, each further intensity spectrum (K2) having an intensity maximum in the region of the intensity minimum of the first intensity spectrum (K1), and a device (30) for merging the light of the first LED (10) and the light of the at least one further LED (20), by means of which illuminating light can be produced with a combined intensity spectrum (K3) composed of light with the first intensity spectrum and light with each of the further intensity spectra.

10 Claims, 4 Drawing Sheets

ILLUMINATING ARRANGEMENT FOR A MICROSCOPE

CROSS REFERENCE TO RELATED APPLICATIONS

This application claims priority of German patent application number 10 2011 084 574.7 filed Oct. 14, 2011, the entire disclosure of which is incorporated by reference herein.

FIELD OF THE INVENTION

The present invention relates to an illuminating arrangement for a microscope.

BACKGROUND OF THE INVENTION

In cytodiagnostics and pathology, for example, stained specimens are examined under the microscope, usually with transmitted-light bright field illumination. The colour of the specimen examined under the microscope is an important criterion for the diagnosis.

In recent decades, halogen lamps have been used as lighting means in the microscope, e.g. for transmitted-light bright field illumination. The light emitted by the halogen lamp corresponds primarily to the continuous spectrum of a black body radiator (Planckian radiator). Usually, a thermal protection filter that greatly attenuates the infrared range of the radiation emitted is incorporated in a lamp housing with a halogen lamp. Often an absorbent glass (KG1, 2 mm thick) is used as the thermal protection filter. The continuous spectrum of the resulting illumination enables the user to arrive at a reliable assessment of the stain colour.

For evaluating colours under illumination with a specific light source, the so-called Colour Rendering Index, CRI, is of importance. By this is meant a photometric value which can be used to describe the quality of colour reproduction of light sources of the same correlated colour temperature. The reference used for assessing the colour rendering quality, up to a colour temperature of 5,000K, is the light emitted by a black body radiator of the corresponding colour temperature. Beyond a colour temperature of 5,000 K, a spectral distribution similar to daylight is used as reference. For example, the spectrum of a black body radiator with a temperature of 2,700 K is used to calculate the colour rendering of a domestic incandescent lamp, which is itself a close approximation of a Planckian radiator. Each light source that perfectly replicates the spectrum of a black-body radiator of the same (correlated) colour temperature in the range of the visible wavelengths achieves a colour rendering index of 100. Halogen lamps, like incandescent bulbs, may achieve colour rendering indices of up to 100.

In microscopy, the halogen lamp is increasingly being replaced by light-emitting diodes (hereinafter LEDs) with their known advantages. These advantages include a higher radiation of light with a lower consumption of electric power and a longer life. White light LEDs are predominantly used for transmitted-light illumination. In a standard commercial white-light standard LED, a blue, violet or a UV-LED is combined with photoluminescent material in a housing as an integrated bluish unit. Usually, a blue LED is used which is combined with a yellow fluorescent substance. UV-LEDs with a number of different fluorescent substances (usually red, green and blue) may also be used. According to the principles of additive colour mixing, white light is produced with LEDs of this kind. The components thus produced have good colour rendering properties, with the colour rendering indices being between 70 and 90. However, white light LEDs do not emit a continuous spectrum. The white light LEDs based on blue LEDs have strong emissions for example in the blue spectral range (at about 450 nm), a minimum in the blue-green (at about 500 nm) and a stronger emission range at higher wavelengths with a maximum at about 550 nm, which drops away sharply at about 650 nm.

The ratio of intensity minimum at 500 nm to intensity maximum at about 450 nm is approximately 10-20%, depending on the type of LED. With a non-continuous spectrum of this kind as the specimen lighting, colour assessment is more difficult and deviates from the experiential values obtained by microscope illumination using a halogen lamp.

DE 10 2007 022 666 A1 addresses this problem. To provide a continuous spectral distribution that corresponds as closely as possible to daylight, this publication proposes adjusting the ranges of the above-mentioned intensity maxima to a lower and substantially identical intensity, using filters. In this way a continuous spectrum can be simulated, although it corresponds only somewhat to that of daylight. Another disadvantage is the loss of intensity that accompanies the use of such filters. For this reason, the white light LEDs used have to be very powerful, leading to higher energy costs, the generation of more heat in the microscope and a bulkier construction (on account of the cooling means or fans required).

Consequently, the problem of the present invention is to provide powerful illumination for a microscope by means of which as continuous a spectrum as possible can be effectively produced, corresponding substantially to the daylight spectrum or perceived as such by an observer.

SUMMARY OF THE INVENTION

This problem is solved by an illuminating arrangement, an illuminating method, and a microscope described herein.

Thanks to the novel measure of implementing illumination for a microscope with at least two LEDs, the intensity spectra of which are complementary to one another, it is possible to simulate a continuous spectrum, particularly a daylight spectrum, with no loss of intensity. Compared with conventional solutions, LED outputs can thus be made smaller in size, leading to a reduction in energy consumption and a lower generation of heat. There is no need for any heat removal or cooling measures that used to be necessary to some extent in the prior art solutions. The invention provides for an intensity minimum of a first LED to be complemented by the use of at least one other LED that has an intensity maximum in the region of the intensity minimum of the first LED. In particular, the intensity maximum of another LED of this kind may be located as precisely as possible at the site of the intensity minimum of the first LED, for example in a range of +/−5 to 10 nm about this minimum. It is also advantageously possible to compensate an intensity minimum of a first LED of this kind by the provision of two or more, e.g. three, other LEDs which have their intensity maximum in the region of the intensity minimum of the first LED. It is conceivable, for example, to use a first additional LED with an intensity maximum at a lower wavelength than the wavelength of the minimum of the first LED, a second LED with an intensity maximum in the region of the intensity minimum of the first LED, and a third LED with an intensity maximum at a somewhat higher wavelength than the wavelength of the minimum of the first LED.

The rule according to which the intensity maximum of the second LED should be within the range of the intensity minimum of the first LED is to be interpreted in particular as meaning that the positions of these extrema should differ by not more than 10 nm, in order to achieve the desired compensation of the intensity minimum of the first LED.

It is preferable for the first LED to be embodied as a white light LED with intensity maxima at about 450 nm and 570 nm, and an intensity minimum at about 500 nm, and for the additional or second LED to be embodied as a blue-green LED with an intensity maximum at about 500 nm.

As examples of white light LEDs that may typically be used or are preferred, reference is made to the "natural white" LEDs made by SeoulSemiconductor, which have a marked minimum at about 500 nm. As an example of a preferred blue-green LED that may be used, reference is made for example to LEDs of the Osram LV W5SN type, which have a marked maximum at 500 nm. The intensity spectra of these two LED types supplement each other, so that without the use of a filter (i.e. in an unfiltered manner) it is possible to produce a continuous intensity spectrum that largely corresponds to the daylight spectrum.

Preferably, the device for merging the light from the first and at least one additional LED is embodied as a polychromatic beam splitter (splitter reflector). Beam splitters of this kind have the property of reflecting light of a defined spectral range, while transmitting light outside this spectral range.

The transmission and reflection properties of the beam splitter can preferably be chosen so as to correspond precisely to the spectral patterns of the selected LEDs.

In particular it is preferable that the beam splitter transmits, or, alternatively, reflects only between the wavelengths at which the intensity spectra of a first and an additional LED intersect. Specifically, this means that the polychromatic beam splitter is embodied to be transmissive between the wavelengths in which the intensity spectra of the first LED and a second LED intersect, and reflective in the other spectral ranges, or alternatively reflective between the wavelengths in which the intensity spectra of the first LED and the second LED intersect, and transmissive in the other spectral ranges. In this way, illuminating light is obtained having a combined intensity spectrum which is made up of light of the first intensity spectrum and light of the second intensity spectrum or that of any additional intensity spectra.

Preferably, the beam splitter is selected so as to transmit in a spectral range from about 480-520 nm and to reflect outside this spectral range. It is also possible for the beam splitter to reflect in the spectral range from about 480-520 nm, and to transmit outside this range.

Particularly preferably, the angle of incidence for light incident on the beam splitter and reflected off this beam splitter is adjusted to 20° to 50°, preferably 20° to 35°, more preferably 30°.

By the angle of incidence is meant here, according to the conventional terminology, the angle between the central beam of the incident light and the normal to the surface of the beam splitter. Usually, angles of incidence of 45° are used. The smaller the angle of incidence is chosen to be, the steeper will be the transition between the transmission and reflection of the splitter reflector. Thus it is possible to define the transition between transmission and reflection particularly precisely, and to minimise the losses of intensity that accompany softer or flatter transitions.

It is preferable for the illuminating light emanating from the device for merging the light (beam splitter) to be coupled into the microscope through at least one lens.

The illuminating arrangement according to the invention may be used within the scope of all the conventional types of microscope illumination, while reference will be made here, purely by way of example, to bright field illumination, dark field illumination, transmitted-light illumination and down-light illumination, which can also be used in conventional combinations with one another, for example as transmitted-light bright field illumination.

In practice, first of all, the spectral emission of a white light LED that is to be used can be determined exactly using a suitable spectrometer, for example. At least one suitable additional LED is selected for this purpose.

Details of the spectral patterns of white light LEDs and further LEDs that are to be used in addition can be found in the embodiments described by way of example hereinafter.

It will be understood that the features stated above and those that are yet to be explained can be used not only in the particular combination specified but also in other combinations or on their own, without departing from the framework of the present invention.

BRIEF DESCRIPTION OF THE DRAWINGS

The invention is schematically illustrated by an embodiment by way of example in the accompanying drawings and is hereinafter described in detail with reference to the drawings.

DETAILED DESCRIPTION OF THE INVENTION

Figure 1:
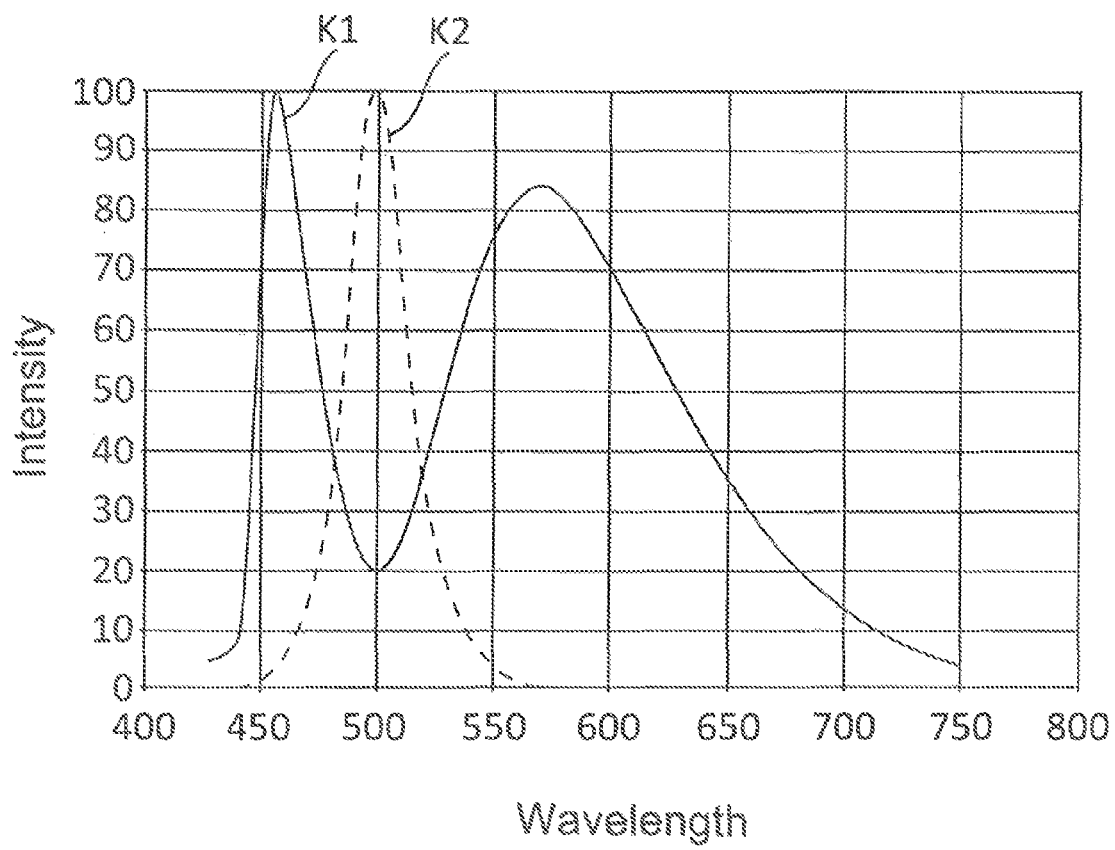
FIG. 1 shows typical intensity spectra of a white light LED (continuous line) and a blue-green LED (broken line)

FIG. 1 schematically shows two intensity patterns or spectra of different LEDs plotted against the wavelength (in nanometres). The intensities shown are standardised to 100. The wavelength range shown encompasses roughly 430-750 nm and thus the visible wavelength range from violet, through blue, green, yellow, orange and red.

The curve K1 marked by a continuous line shows the typical spectral pattern of a white light LED which emits in the blue wavelength range, and for example excites a conversion colouring agent to light up in the green-yellow spectral range. According to the first maximum of the curve K1 in the blue wavelength range is at about 450-460 nm, and the second maximum in the green-yellow spectral range is at about 550-580 nm. It will be seen that the range of the second maximum is broader than that of the first. Between these maxima is a minimum at about 500 nm. With various white light LEDs of the same type (in this case a blue LED with conversion colouring agent) the position and height of the maxima and minima of the spectral pattern may be different. LEDs having similar maxima and minima in the spectral pattern are allocated to a particular colour rank by the manufacturers.

A daylight spectrum, not shown in FIG. 1, has a relatively uniform (continuous) intensity pattern, in particular between about 450 nm and 650 nm. It follows directly from this that the spectrum K1 of the white light LED shown in the range around 500 nm cannot replicate the daylight spectrum to a sufficiently high degree.

The broken curve K2 represents the spectral pattern of a second LED, namely a blue-green LED, for example of the Osram LV W5SN type, which has a spectral intensity maximum precisely in the range around 500 nm. The idea of the invention is to combine the intensity spectra according to the curves K1 and K2 with one another so that a substantially continuous spectrum can be produced.

Figure 2:
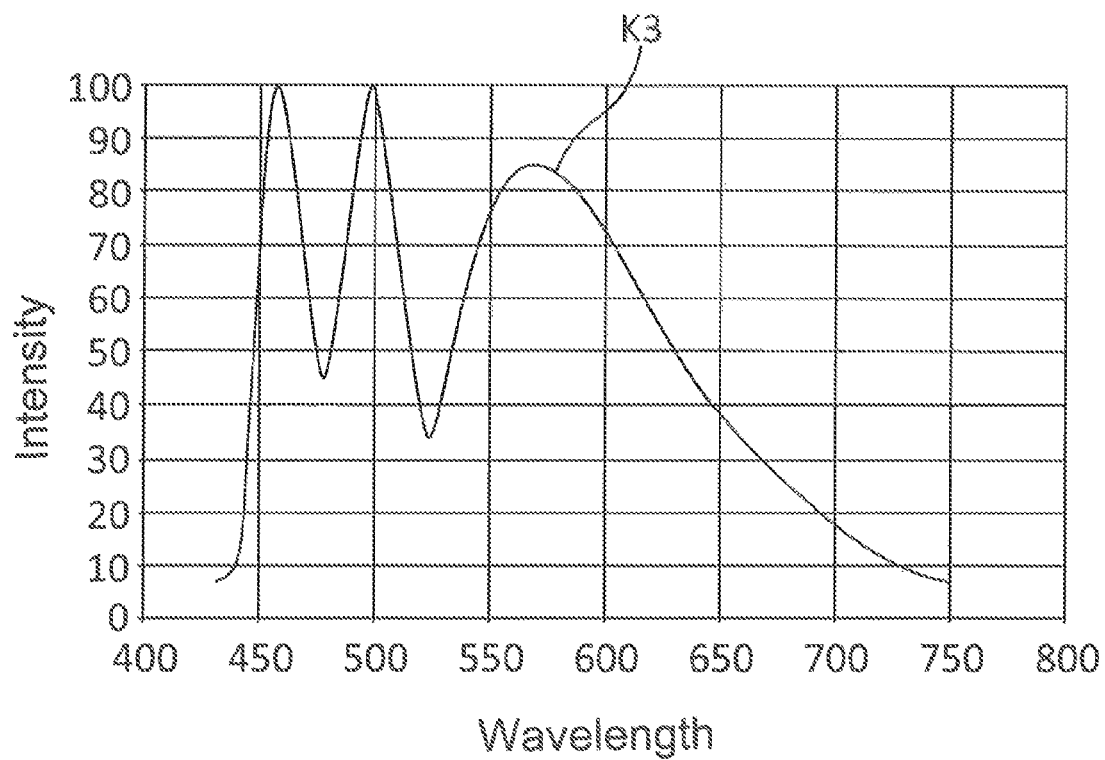
FIG. 2 shows the intensity spectrum of the illuminating light that is provided according to a preferred embodiment of the invention, which is made up of the intensity spectra of the LEDs according to FIG. 1.

FIG. 2 shows the composite intensity spectrum of the two LEDs, as described above with reference to FIG. 1, that is obtained using an arrangement as described hereinafter with reference to FIG. 4, and designated K3. It will be seen that a substantially more uniform intensity spectrum can be produced in the visible spectral range, i.e. between about 450 and 650 nm, than was possible using only the white light LED according to FIG. 1. According to the invention, illuminating light for a microscope is thus provided with this intensity spectrum K3.

The intensity spectrum that can be achieved by the superimposing or merging of the intensity spectra of the two LEDs mentioned already constitutes an intensity distribution that, physiologically, roughly corresponds to daylight. The intensity minima remaining are so narrow that they are not a problem to the human eye. By the additional use of further LEDs (for example with intensity maxima at 470 and/or 530 nm) it is possible to approximate the resulting intensity spectrum even more closely to the intensity distribution of daylight.

Figure 3:
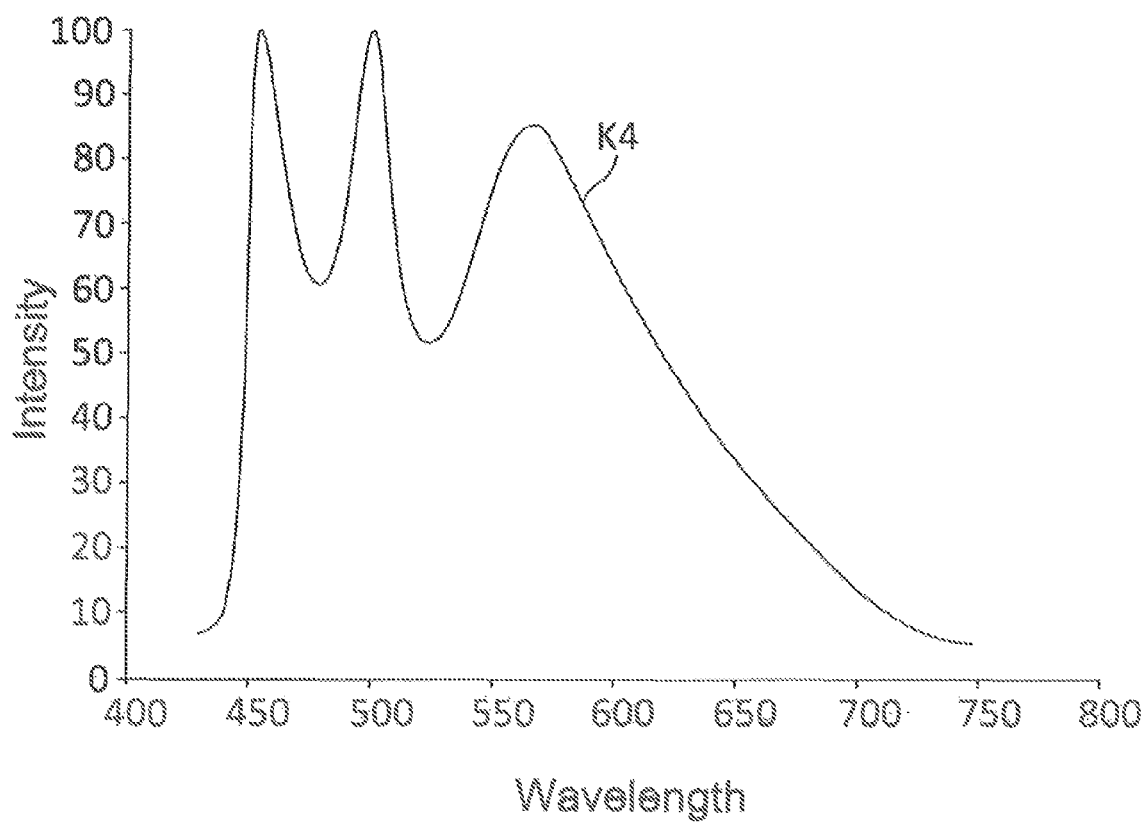
FIG. 3 shows a composite intensity spectrum according to FIG. 2, but in which the blue-green LED has been replaced by an LED with a broader peak around its intensity maximum.

FIG. 3 shows a composite intensity spectrum K4 in which the second LED of FIG. 2 is replaced by an LED which does indeed have the intensity maximum at the same wavelength, but in which the intensity pattern around the maximum is substantially broader. It will be appreciated that the intensity minima have a higher intensity, compared with FIG. 2.

Figure 4:
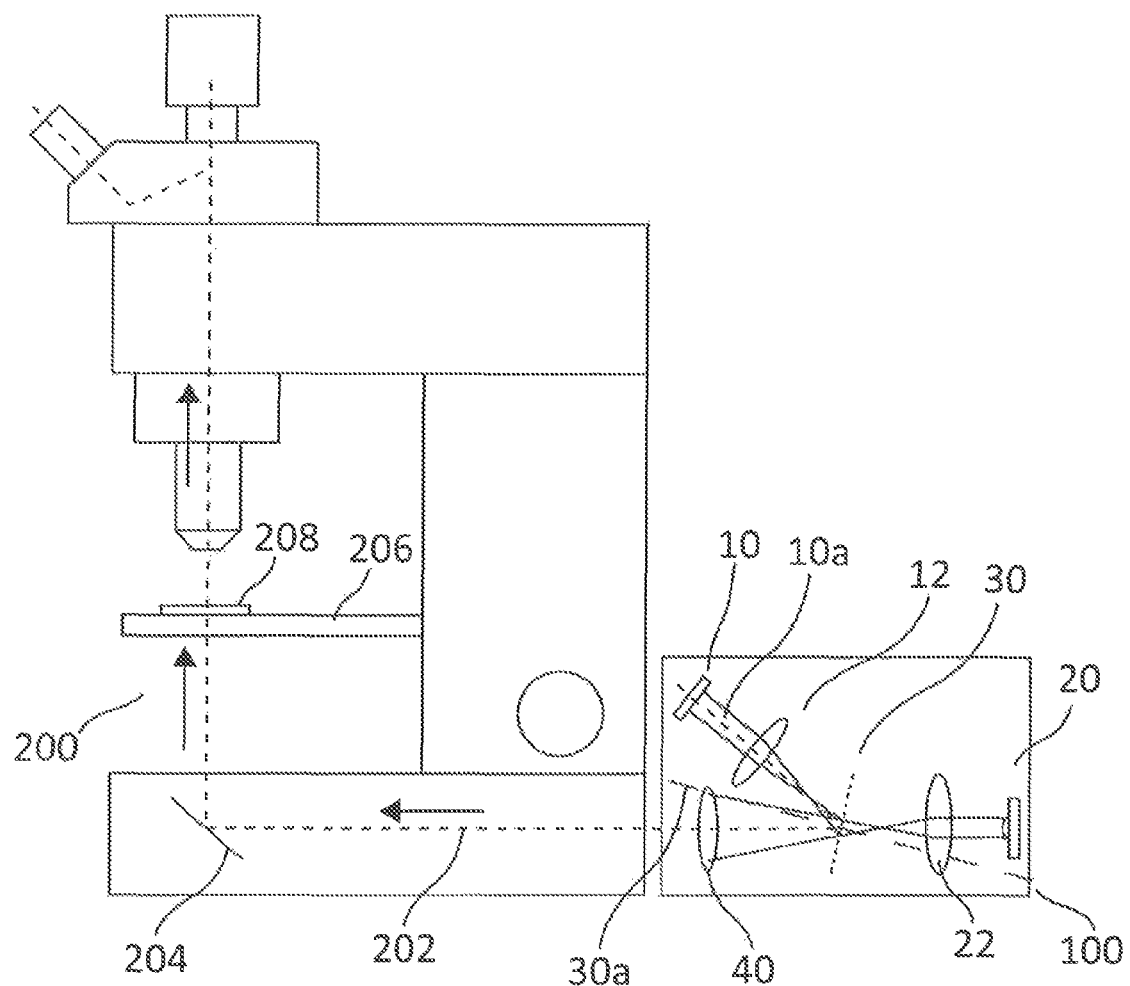
FIG. 4 shows a preferred embodiment of the illuminating arrangement according to the invention together with a microscope.

In FIG. 4 a preferred embodiment of an illuminating arrangement according to the invention is generally designated 100. This illuminating arrangement 100 is used for coupling illuminating light into a microscope 200. The microscope is not specifically described here. Some components that are relevant within the scope of the illuminating arrangement will merely be briefly discussed.

The illuminating arrangement 100 has a first LED 10 which is provided as a white light LED. The illuminating arrangement 100 also has a second LED 20 which is provided as a blue-green LED. Light emanating from the first LED 10 is directed through a lens 12 onto a polychromatic beam splitter 30 on which the light is reflected in the wavelength ranges of the two intensity maxima. In the spectral range of the minimum of the first LED 10, i.e. roughly between 40 nm and 520 nm, the polychromatic beam splitter 30 is transmissive and thus lets this light through. After being reflected off the beam splitter 30 the light emanating from the LED 10 is propagated along an optical axis 202.

The light emanating from the second LED 20, after passing through a second lens 22, also strikes the polychromatic beam splitter 30, but is transmitted or let through by it substantially completely, i.e. in the range from 480 nm to 520 nm. In other words, the polychromatic beam splitter 30 is embodied to be transmissive for light of the wave-lengths that are radiated by the second LED 20. The second LED 20 is arranged on the optical axis 202. The light from the second LED 20 transmitted by the beam splitter 30 is therefore also propagated along this optical axis 202. Thus, overall, there is a superimposition of the reflected light from the first LED 10 and the transmitted light of the LED 20. This light constitutes the illuminating light for the microscope 200. The illuminating light is coupled into the microscope 200 along the optical axis 202 through another lens 40.

In the embodiment shown in FIG. 4, the illuminating light strikes a deflecting reflector 204 and is deflected downwards by it onto an object 208 held on a microscope slide 206. The illuminating light is thus used, according to the embodiment shown, as a transmitted-light illuminating light. It is, of course, possible to use the light provided by the illuminating arrangement 100 within the scope of down-lighting illuminations, etc.

FIG. 4 also shows that the angle of incidence of the light emanating from the first LED 20 and striking the polychromatic beam splitter 30 is less than 45°. The angle of incidence refers to the angle between the central beam 10a of the light radiated by the LED 10 and the normal 30a to the surface of the reflector 30. For certain embodiments, however, smaller angles of incidence, for example 30°, are preferred. With these smaller angles of incidence, steeper transitions (flanks) are obtained for the reflectivity-transmissivity transition of the polychromatic beam splitter 30. In this way, intensity losses for the light emanating from the LED 10 can be minimised.

It should be noted that according to a modified construction it is also possible to arrange both or several LEDs substantially on the optical axis 202. In this case, the polychromatic beam splitter can be omitted. Moreover, losses of intensity on the beam splitter or resulting from the use of the beam splitter can be avoided.

The invention is not to be limited to the specific embodiments disclosed, and modifications and other embodiments are intended to be included within the scope of the invention.

LIST OF REFERENCE NUMERALS 10 first LED
12 lens
20 second LED
22 lens
30 polychromatic beam splitter
40 lens
100 illuminating arrangement
200 microscope
202 optical axis
204 deflecting reflector
206 microscope slide
208 object
K1 first intensity spectrum
K2 second intensity spectrum
K3 combined intensity spectrum

What is claimed is:
1. An illuminating arrangement (100) for a microscope (200), comprising:
   a first LED (10) which radiates with a first intensity spectrum (K1) with at least two intensity maxima and an intensity minimum located between the at least two intensity maxima;
   at least one further LED (20) which radiates light with a further intensity spectrum (K2) respectively, each further intensity spectrum (K2) having an intensity maximum in the region of the intensity minimum of the first intensity spectrum (K1); and
   a device (30) for merging the light of the first LED (10) and the light of the at least one further LED (20), said device (30) providing illuminating light with a continuous combined daylight-approximating intensity spectrum (K3) composed of unfiltered light of the first intensity spectrum and unfiltered light of said further intensity spectrum.

2. The illuminating arrangement according to claim 1, wherein the first LED (10) is a white light LED with intensity maxima at about 450 nm and 570 nm and an intensity minimum at about 500 nm, and the at least one further LED (20) is a blue-green LED with an intensity maximum at about 500 nm.

3. The illuminating arrangement according to claim 1, wherein the device (30) for merging the light of the first LED (10) and the at least one further LED (20) is a polychromatic beam splitter (30).

4. The illuminating arrangement according to claim 3, wherein the polychromatic beam splitter (30) is provided to be transmissive between the wavelengths in which the intensity spectra of the first LED (10) and a second LED (20) intersect, and reflective in other spectral ranges.

5. The illuminating arrangement according to claim 3, wherein the polychromatic beam splitter (30) is provided to be reflective between the wavelengths in which the intensity spectra of the first LED (10) and the second LED (20) intersect, and transmissive in other spectral ranges.

6. The illuminating arrangement according to claim 3, wherein the polychromatic beam splitter (30) is provided to be transmissive in a spectral range of about 480 to 520 nm and reflective in other spectral ranges.

7. The illuminating arrangement according to claim 3, wherein the polychromatic beam splitter (30) is provided to be reflective in a spectral range of about 480 nm to 520 nm, and transmissive in other spectral ranges.

8. The illuminating arrangement according to claim 3, wherein light incident on, and light reflected off, the polychromatic beam splitter (30) has an angle of incidence between 20 to 50°.

9. The illuminating arrangement according to claim 1, wherein illuminating light with a combined intensity spectrum (K3), merged by the device (30), is configured to be coupled into the microscope through at least one lens (40).

10. A microscope (200), comprising:
an illuminating arrangement (100) including:
a first LED (10) which radiates with a first intensity spectrum (K1) with at least two intensity maxima and an intensity minimum located between the intensity maxima;
at least one further LED (20) which radiates light with a further intensity spectrum (K2) respectively, each further intensity spectrum (K2) having an intensity maximum in the region of the intensity minimum of the first intensity spectrum (K1); and
a device (30) for merging the light of the first LED (10) and the light of the at least one further LED (20), said device (30) providing illuminating light with a continuous combined daylight-approximating intensity spectrum (K3) composed of unfiltered light of the first intensity spectrum and unfiltered light of each of the further intensity spectra.

* * * * *